United States Patent
Majszak et al.

(10) Patent No.: US 10,744,530 B2
(45) Date of Patent: Aug. 18, 2020

(54) METHOD OF PRODUCING A SPECIFIED COEFFICIENT OF FRICTION ON BOTH SIDES OF A SUBSTRATE

(71) Applicant: SUN CHEMICAL CORPORATION, Parsippany, NJ (US)

(72) Inventors: Anthony Majszak, Wheaton, IL (US); Craig Boyd, North Aurora, IL (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 350 days.

(21) Appl. No.: 15/514,897

(22) PCT Filed: Sep. 23, 2015

(86) PCT No.: PCT/US2015/051620
§ 371 (c)(1),
(2) Date: Mar. 28, 2017

(87) PCT Pub. No.: WO2016/053706
PCT Pub. Date: Apr. 7, 2016

(65) Prior Publication Data
US 2017/0216880 A1    Aug. 3, 2017

Related U.S. Application Data

(60) Provisional application No. 62/056,779, filed on Sep. 29, 2014.

(51) Int. Cl.
| | | |
|---|---|---|
| B05D 7/26 | (2006.01) | |
| B32B 27/08 | (2006.01) | |
| B32B 27/34 | (2006.01) | |
| B32B 27/32 | (2006.01) | |
| B32B 27/36 | (2006.01) | |
| B32B 15/01 | (2006.01) | |
| B05D 1/28 | (2006.01) | |
| B05D 7/00 | (2006.01) | |
| B05D 7/14 | (2006.01) | |
| C09D 177/00 | (2006.01) | |
| C09D 101/18 | (2006.01) | |
| B32B 15/08 | (2006.01) | |
| C08K 5/20 | (2006.01) | |
| C09D 191/06 | (2006.01) | |
| B05D 3/00 | (2006.01) | |
| B05D 7/16 | (2006.01) | |

(52) U.S. Cl.
CPC .............. *B05D 7/26* (2013.01); *B05D 1/28* (2013.01); *B05D 3/007* (2013.01); *B05D 7/14* (2013.01); *B05D 7/16* (2013.01); *B05D 7/53* (2013.01); *B05D 7/534* (2013.01); *B32B 15/01* (2013.01); *B32B 15/08* (2013.01); *B32B 27/08* (2013.01); *B32B 27/32* (2013.01); *B32B 27/34* (2013.01); *B32B 27/36* (2013.01); *C08K 5/20* (2013.01); *C09D 101/18* (2013.01); *C09D 177/00* (2013.01); *C09D 191/06* (2013.01); *B05D 2202/25* (2013.01); *B05D 2252/02* (2013.01); *B05D 2252/10* (2013.01); *B32B 2250/02* (2013.01); *B32B 2255/10* (2013.01); *B32B 2255/26* (2013.01); *B32B 2307/546* (2013.01); *B32B 2307/744* (2013.01); *B32B 2439/70* (2013.01); *B32B 2553/00* (2013.01)

(58) Field of Classification Search
CPC ......... B32B 27/08; B32B 27/36; B32B 15/08; B05D 3/007; B05D 3/12; B05D 1/28; B05D 1/283; B05D 2252/10; B05D 7/14; B05D 7/16; B05D 7/26; C09D 101/18; C09D 177/00–12; C09D 191/06; C08K 5/20

See application file for complete search history.

(56) References Cited

U.S. PATENT DOCUMENTS

| | | | | |
|---|---|---|---|---|
| 3,111,418 | A * | 11/1963 | Gilbert | B65D 65/42 427/177 |
| 3,615,289 | A * | 10/1971 | Felton | C11C 5/002 44/275 |
| 3,714,101 | A * | 1/1973 | Knechtges | C08C 1/145 524/160 |
| 3,985,687 | A * | 10/1976 | Inamorato | C11D 1/83 510/325 |
| 4,347,282 | A * | 8/1982 | Ehrhardt | B41M 5/124 106/31.16 |
| 4,479,989 | A * | 10/1984 | Mahal | A61J 1/05 428/35.5 |
| 4,659,612 | A | 4/1987 | Balloni | |

(Continued)

FOREIGN PATENT DOCUMENTS

EP    1 136 519 A2    9/2001

OTHER PUBLICATIONS

International Preliminary Report issued in International Patent Application No. PCT/US2015/051620, dated Apr. 4, 2017.

(Continued)

*Primary Examiner* — Kregg T Brooks
(74) *Attorney, Agent, or Firm* — Charles C. Achkar; Ostrolenk Faber LLP

(57) ABSTRACT

The present invention provides a method for printing and coating a flexible substrate web so as to attain a specified coefficient of friction on both sides of the substrate web which employs the use of controlled set-off of coated and/or printed material from the front side to the back side side of the web. Furthermore the method provides a substrate web produced therefrom and the method is useful for packaging substrate webs and, in particular, foil substrate webs.

12 Claims, No Drawings

(56) References Cited

U.S. PATENT DOCUMENTS

| | | | |
|---|---|---|---|
| 4,692,379 A | 9/1987 | Keung | |
| 4,734,317 A | 3/1988 | Bothe et al. | |
| 5,057,177 A | 10/1991 | Balloni et al. | |
| 5,223,346 A * | 6/1993 | Lu | B32B 27/32 |
| | | | 428/516 |
| 5,643,984 A * | 7/1997 | Mueller | C08L 91/04 |
| | | | 106/2 |
| 6,613,430 B2 * | 9/2003 | Culbertson | C09D 123/02 |
| | | | 428/352 |
| 7,267,862 B1 | 9/2007 | Burke et al. | |
| 2004/0023052 A1 * | 2/2004 | Ambroise | B32B 27/20 |
| | | | 428/515 |
| 2006/0269710 A1 | 11/2006 | Inglis | |
| 2006/0275589 A1 | 12/2006 | Hollingbery et al. | |
| 2007/0009666 A1 | 1/2007 | Davisson | |
| 2008/0213522 A1 | 9/2008 | Singh | |
| 2009/0014999 A1 * | 1/2009 | Patel | B41M 3/006 |
| | | | 283/72 |
| 2011/0293848 A1 | 12/2011 | Weyer | |
| 2015/0275032 A1 * | 10/2015 | Deak | C08J 7/047 |
| | | | 428/195.1 |

OTHER PUBLICATIONS

International Search Report issued in International Application No. PCT/US2015/051620, dated Dec. 11, 2015.
Written Opinion of the International Searching Authority issued in International Application No. PCT/US2015/051620, dated Dec. 11, 2015.
Supplementary European Search Report issued in European Patent Application 15 84 5915.6 dated Aug. 28, 2017.

\* cited by examiner

METHOD OF PRODUCING A SPECIFIED COEFFICIENT OF FRICTION ON BOTH SIDES OF A SUBSTRATE

CROSS REFERENCE TO RELATED APPLICATIONS

The present application is a § 371 National Phase application based on PCT/US2015/051620 filed Sep. 23, 2015, which claims the benefit of U.S. Provisional Application No. 62/056,779, filed Sep. 29, 2014, the subject matter of each of which is incorporated by reference in their entirety.

FIELD OF THE INVENTION

The present invention is directed to a method of producing a specified coefficient of friction, on both the front side and the back side of flexible substrate web or roll without the need to apply a coating separately to both sides of the substrate.

BACKGROUND OF THE INVENTION

Presently, for many end users in the packaging industry which employ substrate webs and rolls there is a problem in that the coefficient of friction (CoF) is often too high on both the front side and the back side of the substrate web to achieve proper processing on packaging lines and this is particularly problematic in the case of aluminum foils.

Typically, a low CoF is desirable and usually it is only necessary to provide a low CoF on one side of the aluminum foil. However, in a number of cases a low CoF on both sides of the web is required and thus a special coating needs to be applied to both sides.

U.S. Pat. No. 7,267,862 discloses the use of primary and secondary amides which interact favorably so as to control CoF in polyolefin and other films whilst US2008/0213522 is directed to a coated polymeric film for the use in a method of wrapping a ream of paper in a packaging film wherein the coating is used to control CoF. The polymeric film may be coated on both sides of the polymeric film.

Consequently, there is a requirement to provide a more efficient process that can modify the CoF on both the front side and the back side of a substrate web without the need to apply separate coatings thereon.

SUMMARY OF THE INVENTION

The present invention provides a method of producing a specified coefficient of friction (CoF) on both a first side and an opposite side of a flexible substrate web comprising
a) unwinding the substrate web;
b) applying at least one layer of varnish to the first side of the unwound substrate web;
c) drying the layer of varnish and
d) rewinding the substrate web such that at least a portion of the varnish on the first side is transferred to the opposite side of the substrate web.

The present invention also provides a substrate web produced by the above mentioned method and a packaging article manufactured from the substrate web.

These and other objects, advantages, and features of the invention will become apparent to those persons skilled in the art upon reading the details of the methods and formulations as more fully described below.

DETAILED DESCRIPTION OF THE INVENTION

It has now been found that a specific or modified CoF can be attained on both a first side, typically the front side and an opposite side, typically the back side of a flexible substrate web or roll by applying a varnish to only the front side of an unwound substrate web, thereby modifying its CoF, such that when the substrate web is rewound the front side contacts the back side and transfers (offsets) at least some of the varnish to the back side thus modifying its CoF without the need to apply a separate coating.

The CoF used herein relates to kinetic CoF measurements.

The varnish may be applied directly onto the surface of the substrate and any number of layers may be applied thereon.

However, preferably at least one layer of an ink is applied to the front side of the substrate web and the varnish layer(s) applied thereafter.

The varnish may be oxidatively curing, ultraviolet (UV) curing or electron beam (EB) curing.

Furthermore, the varnish may be solvent-based or water-based but is advantageously solvent-based varnish.

Typically, the varnish and/or ink layer(s) comprise at least one wax material and advantageously the uppermost layer of varnish and/or ink contains at least one wax material, usually at least two and preferably at least three wax materials.

The wax material is usually selected from the group consisting of polyethylene wax, polytetrafluoroethylene (PTFE) wax, polyethylene stearamide wax, lanolin, carnauba wax, erucamide wax, amide waxes and/or micronized wax.

Preferably, the wax material is selected from polypropylene wax, erucamide wax and/or polyethylene stearamide wax.

Advantageously, the wax material(s) are food-grade wax materials.

The wax materials are selected to impart particular properties to the varnish such as "rub and scruff resistance", "initial and migratory slip", and "migratory slip".

Those wax materials that impart "rub and scruff resistance" are usually present in the amount of between 0.01 to 0.5 wt %, preferably between 0.05 to 0.25 wt % and advantageously between 0.1 to 0.2 wt %.

Those wax materials that impart "initial and migratory slip" are usually present in the amount of between 0.05 to 3.0 wt %, preferably between 0.2 to 2.0 wt % and advantageously between 0.4 to 1.2 wt %.

Finally those wax materials that impart "migratory slip" are usually present in the amount of between 0.01 to 1.5 wt %, preferably between 0.1 to 0.5 wt % and advantageously between 0.2 to 0.3 wt %.

In particular, too little wax material causes an excessive CoF value on either the front or back side of the substrate web, whilst too much wax material results in a CoF below the desired target range.

Furthermore the varnish typically includes a binder such as polyamide resin or a nitrocellulose resin and the binder is typically present in the amount of between 5 to 50 wt %, preferably between 15 to 45 wt % and advantageously between 20 to 40 wt %.

Advantageously, the ink and/or varnish comprises at least one nitrocellulose resin.

Finally the varnish may include an antigelling agent, a plasticizer and/or a solvent reducer.

In a particular embodiment the preferred waxes are as follows:

Shamrock Non-Skid 5389 Wax, mainly selected for its rub and scuff resistance, typically used in the amount of between 0.01 to 0.5 wt %, preferably between 0.01 to 0.26 wt %, and most preferably between 0.08 to 0.20 wt;

Shamrock Low Angle 5413 Wax which provides reduced slip (lower CoF) to both the front and back surfaces of the substrate web typically used in the amount of between 0.05 to 3.00 wt %, preferably between 0.05 to 1.80 wt %, and most preferably between 0.50 to 1.00 wt % and Aakash Chemicals Finawax E and Finawax S waxes which primarily provide reduced slip to the back side of the substrate.

Finawax E is typically used in the amount of between 0.01 to 0.60 wt %, preferably between 0.01 to 0.35 wt %, and most preferably between 0.05 to 0.15 wt %, whilst Finawax S is preferably used in the amount of between 0.01 to 0.90 wt %, more preferably between 0.01 to 0.53 wt %, and most preferably between 0.10 to 0.20%.

Preferably, when compared to the non-treated substrate web surface, the treated substrate web surface on both the front side and the back side has a lower CoF and typically has a value of between 0.20 to 0.40 after rewinding the substrate web and advantageously to between 0.25 to 0.35.

However, the CoF of the front and back side of the treated substrate web need not be identical.

The substrate web is usually selected from the group consisting of polyester, polypropylene, polyethylene, nylon, and aluminum foil and is preferably aluminum foil.

Advantageously, the substrate is a packaging foil substrate.

In a particular embodiment of the invention the substrate web is a laminate of at least two films selected from the group consisting of polyester, polypropylene, polyethylene nylon, and aluminum foil.

The varnish, also referred to as an overprint varnish (OPV), particularly when applied over an ink layer, needs to exhibit acceptable adhesion to the substrate whilst also being capable of setting-off when rewinding the web or the roll to create the desired CoF on both the front side and back side of the substrate web.

In the preferred embodiment of the invention a first set of underlying printing inks and/or coatings are printed onto the substrate web surface and subsequently overprinted with an OPV, to produce the set off resulting in the desired CoF on both the front and back side of the substrate. The first down printing inks and/or coatings play a role in this embodiment and they are advantageously based upon a polyamide/nitrocellulose resin combination.

Alternatively, they could also be based upon a polyamide and/or nitrocellulose alone as well as other resin types such as acrylic and urethane resins.

The invention is further described by the examples given below.

EXAMPLES

Example 1. Method for Determining the CoF

The CoF was measured with a TMI model 32-06-00 Monitor/Slip tester with the sled speed set at 6.0 inches per minute and with a 6 inch sled travel distance. CoF was evaluated either print face to print face or backside to backside. Test prints were prepared on the shiny side of virgin aluminum foil with a 360 line hand proofer. Each layer was dried with a hand held heat gun. A total of four test prints were tested. The OPV, with the formulation as shown in table 1, was applied directly onto the shiny side of aluminum foil. Another print was prepared by first printing a black ink (BBV Foil Black, Sun Chemical Corp.) with the OPV over the top of it, the third test print was prepared by printing a white ink (BBV Foil White, Sun Chemical Corp.) followed by the OPV over the top of it. The fourth print was prepared by first printing a blue ink (BBV Foil Blue, Sun Chemical Corp.) with the OPV applied over the top of it. Each print was carefully cut to 5.5 inches by 10.0 inches. Four blank sheets of aluminum foil were also cut to 5.5"×10.0" and placed over each test print, with the dull side of the blank foil in contact with the print side. These prints were carefully stacked on top of each other and placed into the back pages of a hard cover book. 35 pounds of weight was placed on top of the book so that the weight was evenly distributed across the face of the book. The book was allowed to sit at room temperature for 16 hours. After the 16 hours, the weight was removed and the prints were removed from the book. This procedure is representative of rewinding the aluminum foil.

CoF measurements were taken on the front side of the prints immediately after printing, this is called the initial front side CoF. The CoF of the backside of the virgin aluminum foil was taken, this is called the initial backside CoF. CoF measurements were also taken on the front side of the test prints after they were removed from the book, this is called the aged front side CoF. A final CoF measurement was taken on the dull side of the blank film which was in contact with the test print, this was called the aged backside CoF.

TABLE 1

| Overprint Varnish (OVP) | | | | |
|---|---|---|---|---|
| Material | Vendor | Description | Purpose | % |
| Unirez 2248 | Arizona Chemical Co. | Polyamide Resin | Binder | 8.50 |
| Unirez 2215 | Arizona Chemical Co. | Polyamide Resin | Binder | 0.14 |
| NC DHX 3-5 | Sun Chemical Corp. | Nitrocellulose Resin in isopropyl alcohol | Binder | 21.71 |
| Low Angle 5413 | Shamrock Chemical Corp. | Polyethylene - Stearamide hybrid Dry Wax | Initial and Migratory Slip | 0.80 |
| Non-Skid 5389 Wax | Shamrock Chemical Corp. | Polypropylene | Rub and Scuff Resistance | 0.13 |
| Finawax E | Aakash Chemicals | Erucamide Wax | Migratory Slip | 0.10 |
| Finawax S | Aakash Chemicals | Erucamide Wax | Migratory Slip | 0.15 |
| Water | Municipal Water Supply | Water | Anti-Gelling Agent | 0.16 |
| Citroflex A4 | Nexeo Solutions, LLC | Acetyl Tributyl Citrate | Plasticizer | 0.50 |
| iso-propyl Acetate | Nexeo Solutions, LLC | isopropyl Acetate | Solvent Reducer | 9.50 |

TABLE 1-continued

Overprint Varnish (OVP)

| Material | Vendor | Description | Purpose | % |
|---|---|---|---|---|
| Ethyl alcohol SDA-3C | Grain Processing | Ethyl alcohol | Solvent Reducer | 17.60 |
| n-propyl alcohol | Oxea Chemicals | | Solvent Reducer | 25.91 |
| n-propyl acetate | Oxea Chemicals | | Solvent Reducer | 14.80 |
| Total | | | | 100.00 |

TABLE 2

OPV on Foil Substrate w/o Underlying Inks - CoF Results

| Column A Initial Front Side CoF with Example 1 OPV | Column B Aged Front Side CoF with Example 1 OPV | Column C Aged Backside CoF after slip migration | Column D Front Side CoF of raw foil (no OPV) | Column E Backside CoF of raw foil (no slip migration) |
|---|---|---|---|---|
| 0.262 | 0.266 | 0.307 | 0.517 | 0.918 |

The prints in Table 2 were prepared either with or without OPV deposited directly onto the foil substrate. No underlying inks were printed prior to the OPV. All CoF values are kinetic measurements. Front side of foil is the shiny side and is the side OPV is applied to; backside of foil is the dull side and is the side which experiences the slip migration after blocking.

Explanation of Measurements for Tables 2-5:
Column A—CoF of OPV immediately after applying to shiny side of foil
Column B—CoF of OPV after the block test
Column C—CoF of the dull side of the foil after the block test
Column D—CoF of the shiny side of the foil without OPV
Column E—CoF of the dull side of the foil without any slip migration The data in Table 2 shows that the front side (shiny side) of the foil as-is has a kinetic CoF of 0.517 (average of multiple tests). The back side (dull side) of the foil as-is has a kinetic Coefficient of Friction of 0.918 (average of multiple tests).

In order to achieve a lower CoF, preferably in the range of 0.30-0.40, more preferably 0.25-0.35 as required by the end user, a formulated coating is applied to the front side of the foil to achieve an initial Coefficient of Friction of 0.262 (average of multiple tests). After put into roll form (OPV coating comes in contact with the back side of the foil), the Coefficient of Friction of the front side is 0.266 (average of multiple tests) and the Coefficient of Friction of the back side is 0.307 (average of multiple tests).

TABLE 3

BBV Foil OPV Printed Over the Top of BBV Foil Black Ink on Foil Substrate w/o Underlying Inks - CoF Results

| Column A Initial Front Side CoF with Example 1 OPV | Column B Aged Front Side CoF with Example 1 OPV | Column C Aged Backside CoF after slip migration | Column D Front Side CoF of raw foil (no OPV) | Column E Backside CoF of raw foil (no slip migration) |
|---|---|---|---|---|
| 0.259 | 0.294 | 0.341 | 0.517 | 0.918 |

TABLE 4

BBV Foil OPV Printed Over the Top of BBV Foil White Ink on Foil Substrate w/o Underlying Inks - CoF Results

| Column A Initial Front Side CoF with Example 1 OPV | Column B Aged Front Side CoF with Example 1 OPV | Column C Aged Backside CoF after slip migration | Column D Front Side CoF of raw foil (no OPV) | Column E Backside CoF of raw foil (no slip migration) |
|---|---|---|---|---|
| 0.284 | 0.279 | 0.285 | 0.517 | 0.918 |

TABLE 5

BBV Foil OPV Printed Over the Top of BBV Foil Blue Ink on Foil Substrate w/o Underlying Inks - CoF Results

| Column A Initial Front Side CoF with Example 1 OPV | Column B Aged Front Side CoF with Example 1 OPV | Column C Aged Backside CoF after slip migration | Column D Front Side CoF of raw foil (no OPV) | Column E Backside CoF of raw foil (no slip migration) |
|---|---|---|---|---|
| 0.253 | 0.267 | 0.282 | 0.517 | 0.918 |

The data in Tables 2-5 shows that the front side (shiny side) of the foil as-is has a kinetic Coefficient of Friction of 0.517 (average of multiple tests). The back side (dull side) of the foil as-is has a kinetic Coefficient of Friction of 0.918 (average of multiple tests).

In Tables 3-5, the OPV coating is applied over the top of BBV Black, White and Blue inks in order to achieve a lower Coefficient of Friction, in the range of 30-0.40, more preferably 0.25-0.35 on both the front and back sides as required by the end user after the printed substrate is in the roll form (the OPV coating comes into contact with the back side of the foil which is representative of placing the aluminum foil in the form of a roll.

While the present invention has been described with reference to the specific embodiments thereof, it should be understood by those skilled in the art that various changes may be made, and equivalents may be substituted, without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

The invention claimed is:

1. A method of producing a specified coefficient of friction (CoF) on both a first side and an opposite side of a wound flexible substrate web comprising:
   a) unwinding the wound flexible substrate web;
   b) applying at least one layer of varnish to the first side of the unwound flexible substrate web, the varnish comprising at least one wax material that includes polyethylene stearamide wax, and a binder selected from polyamide resin and nitrocellulose resin;

c) drying the layer of varnish and d) rewinding the flexible substrate web such that at least a portion of the varnish on the first side is transferred to the opposite side of the flexible substrate web.

2. The method according to claim 1, wherein prior to applying the at least one layer of varnish to the first side of the substrate web at least one layer of an ink is applied to the first side of the substrate web.

3. The method according to claim 1, wherein the at least one wax material further includes a wax material selected from the group consisting of polyethylene wax, polytetrafluoroethylene (PTFE) wax, lanolin, carnauba wax, erucamide wax, amide waxes and micronized wax.

4. The method according to claim 3, wherein the additional wax material comprises at least one polyethylene wax.

5. The method according to claim 3, wherein the additional wax material comprises at least one erucamide wax.

6. The method according to claim 1, wherein the ink and/or varnish comprises at least one nitrocellulose resin.

7. The method according to claim 1, wherein the substrate web is selected from the group consisting of polyester, polypropylene, polyethylene, nylon, and aluminum foil.

8. The method according to claim 1, wherein the substrate web comprises a laminate of at least two films selected from the group consisting of polyester, polypropylene, polyethylene, nylon, and aluminum foil.

9. The method according to claim 1, wherein the varnish further comprises one or more of another wax, an antigelling agent, a plasticizer, and a solvent reducer.

10. The method according to claim 1, wherein the varnish further comprises another wax, an antigelling agent, a plasticizer, and a solvent reducer.

11. The method of claim 1, wherein the varnish comprises a polyamide resin binder.

12. The method of claim 1, wherein the varnish is selected from an oxidatively curing varnish, ultraviolet curing varnish, and electron beam curing varnish.

* * * * *